United States Patent [19]
Alexander

[11] Patent Number: 6,142,350
[45] Date of Patent: Nov. 7, 2000

[54] FOLDABLE AND DEMOUNTABLE SHOPPING BAG SUPPORT FOR A WHEELCHAIR

[76] Inventor: Myron C. Alexander, Richbell Rd., Apt. 515-D, Larchmont, N.Y. 10538

[21] Appl. No.: 09/220,558

[22] Filed: Dec. 23, 1998

Related U.S. Application Data

[63] Continuation-in-part of application No. 08/766,129, Dec. 16, 1996, abandoned, which is a continuation-in-part of application No. 08/352,349, Dec. 8, 1994, abandoned.

[51] Int. Cl.[7] .............................. B60R 9/00; B60R 11/00
[52] U.S. Cl. .................... 224/407; 224/549; 224/553; 224/555; 297/188.15; 297/188.2; 297/DIG. 4
[58] Field of Search ..................... 224/407, 563, 224/547, 549, 553, 555; 297/188.14, 188.15, 188.2, DIG. 4

[56] References Cited

U.S. PATENT DOCUMENTS

| | | |
|---|---|---|
| 2,830,748 | 4/1958 | Faltin ........................................ 224/563 |
| 3,176,950 | 4/1965 | Hittesdorf ................................. 224/553 |
| 4,339,061 | 7/1982 | Dunn ........................................ 224/407 |
| 4,491,257 | 1/1985 | Ingles ....................................... 224/407 |
| 4,577,903 | 3/1986 | Wells ....................................... 224/407 |
| 5,154,331 | 10/1992 | Sanders ................................... 224/407 |
| 5,180,181 | 1/1993 | Letechipia ............................... 224/407 |
| 5,350,215 | 9/1994 | DeMars ................................... 297/194 |
| 5,513,789 | 5/1996 | Woods et al. ........................... 224/563 |
| 5,704,527 | 1/1998 | Struzer .................................... 224/563 |

*Primary Examiner*—Stephen P. Garbe
*Attorney, Agent, or Firm*—J. Winslow Young

[57] ABSTRACT

A foldable shopping bag support apparatus and method for removably supporting a shopping bag on the wheelchair. A mounting sleeve is telescopically mounted to the armrest of the wheelchair. A backstop is removably secured to the mounting sleeve and is braced against the frame of the wheelchair. A shopping bag support frame is pivotally mounted to the backstop and includes a pair of support arms from which the shopping bag is suspended. A pair of sockets on the shopping bag telescopically receive the support arms.

19 Claims, 4 Drawing Sheets

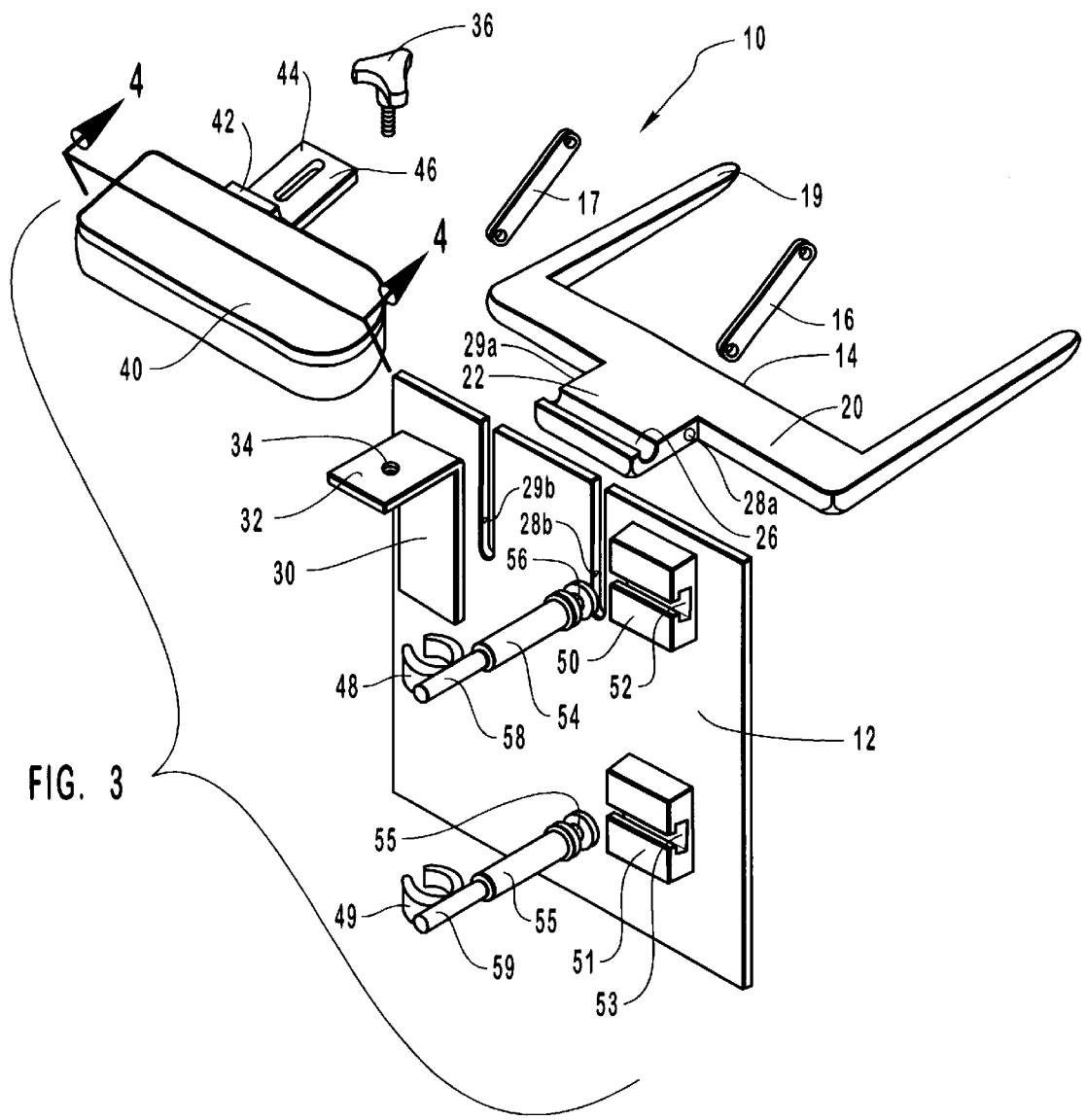
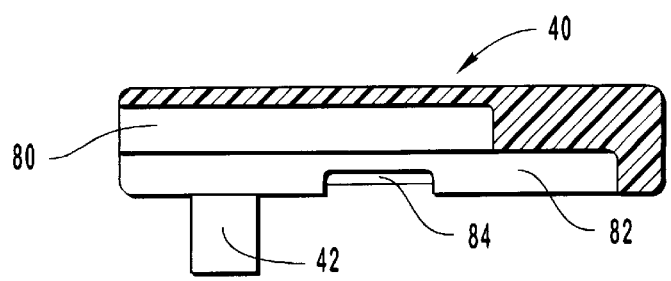

FOLDABLE AND DEMOUNTABLE SHOPPING BAG SUPPORT FOR A WHEELCHAIR

RELATED APPLICATIONS

This application is a continuation-in-part application of my application Ser. No. 08/766,129 filed Dec. 16, 1996 now abandoned, for FOLDABLE AND DEMOUNTABLE SHOPPING BASKET FOR A WHEELCHAIR which was a continuation-in-part application of Ser. No. 08/352,349 filed Dec. 8, 1994, now abandoned, for SHOPPING BASKET FOR HANDICAPPED USE (now abandoned).

BACKGROUND

1. Field of the Invention

This invention relates to a shopping bag and shopping bag support for use by a handicapped person and, more particularly, to a shopping bag support that is foldable as well as being removably mountable to a wheelchair.

2. The Prior Art

Untold thousands, if not hundreds of thousands, of people are required to use a wheelchair for personal mobility. A conventional wheelchair, as the name implies, consists of a pair of large wheels between which a chair or seat is suspended. Stability and steerability is provided by a pair of small, castered wheels, one in front of each large wheel. The wheelchair is foldable in that the seat is collapsible to allow the two, large wheels to be brought into abutment thereby significantly reducing the total volumetric space occupied by the wheelchair upon being folded.

Clearly, the wheelchair has proven to be a boon to handicapped persons because it provides each handicapped individual with a greater range of mobility than would otherwise have been possible. However, I have found that shopping while seated in a wheelchair can be an extremely frustrating experience. Specifically, any items selected for purchase must be held in the lap of the wheelchair occupant until reaching the checkout stand. This is not unduly burdensome if one intends to purchase only one or two items. However, if one is grocery shopping and intends to purchase, say, one gallon of milk, a dozen eggs, a loaf of bread, a carton of ice cream, a package of frozen vegetables, to name few, one can readily note that it would be impossible to transport these items safely and comfortably while riding in a wheelchair in the absence of some sort of shopping bag system.

The patent of Bennet U.S. Pat. No. 3,759,569 discloses a receptacle attachment for fixed mounting to a wheelchair arm. The receptacle is hinged to allow it to be opened outwardly into a receptacle configuration or closed into a slim profile configuration beneath the armrest.

The patent of Wood U.S. Pat. No. 4,815,688 discloses a mounting structure for attachment to a geriatric chair, wheelchair, or the like. A horizontal shroud 42 is configured to be bolted to the frame of the wheelchair and supports a vertically oriented socket. A variety of different items such as an armrest, a shopping basket (FIG. 10), each have a stanchion which is configured to be telescopically received in the socket. The socket thereby provides a secure vertical support while at the same time allowing the item supported thereby to be moved in a horizontal arc.

Numerous other references disclose such features as a basket carrier for a wheeled stroller, see Wasyluk U.S. Pat. No. 2,904,237; a wheelchair table and desk attachment, see Lee U.S. Pat. No. 4,632,451; a basket or tray for attachment to a wheelchair, see Yanez et al. U.S. Pat. No. 5,356,059; a container basket for a wheelchair, see Trubiano U.S. Pat. No. 4,339,063; a basket and tray attachment for a wheelchair, see Bowman et al. U.S. Pat. No. 4,526,419; a convenience basket, desk top or tray mounting system for a wheelchair, see Davis U.S. Pat. No. 4,580,803; a storage compartment for a wheelchair, see Maxwell U.S. Pat. No. 5,207,477; a wheelchair armrest storage compartment, see Schumacher U.S. Pat. No. 4,730,869; a wheelchair armboard, see Van Hamme U.S. Pat. No. 5,505,412; a food and item tray for a wheelchair, see Malone U.S. Pat. No. 4,659,099; a wheelchair armrest and pouch, see Sanders U.S. Pat. No. 5,154,331; and a receptacle attachment for a wheelchair arm, see Bennet U.S. Pat. No. 3,759,569.

However, as can be readily noted from each of these cited references, most of them are awkward, require tools for the purpose of mounting the structure to the wheelchair and is thus essentially a permanent attachment to the wheelchair, or reside directly across the lap of the wheelchair occupant. This means that in order for the wheelchair occupant to be able to leave the wheelchair and transfer to an automobile, for example, the entire tray and its contents must be removed in order for the wheelchair occupant to be able to exit the wheelchair. Further, if one desires to remove the structure from the wheelchair when not in use then tools are required to remove the accompanying support structure from the wheelchair.

In view of the foregoing, it would be an advancement in the art to provide a shopping bag support for supporting a shopping bag to the side of the wheelchair occupant. Another advancement would be to provide a shopping bag support wherein the shopping bag is readily removable from the shopping bag support. It also would be an advancement in the art to provide a foldable shopping bag support that is easily mountable to a wheelchair for use. It would also be an advancement in the art to provide a foldable shopping bag support that is easily demountable from the wheelchair and in the absence of tools. It would also be an advancement in the art to provide a mountable/demountable shopping bag support for a wheelchair having adjustable support struts. Another advancement in the art would be to provide a foldable wheelchair shopping bag support that readily slips over the armrest of a wheelchair. Another advancement in the art would be to provide a retainer apparatus for the armrest of the wheelchair that provides secure support for the foldable shopping bag support while at the same time presenting a visually pleasing appearance and a smooth profile that is comfortable to the touch. It would also be an advancement in the art to provide a method for supporting a shopping bag on the side of a wheelchair. Such a novel shopping basket apparatus and method is disclosed and claimed herein.

BRIEF SUMMARY AND OBJECTS OF THE INVENTION

This invention is a novel shopping bag support apparatus and method for a wheelchair. A pair of support arms on a support frame removably receive the shopping bag and support it adjacent the side of the wheelchair while a backstop portion of the shopping bag support shields the corresponding wheel of the wheelchair against interference by the shopping bag. The support frame is readily foldable into juxtaposition with the backstop when not being used to support the shopping bag. The shopping bag support is readily mountable to and demountable from the armrest of the wheelchair and is downwardly foldable when the shopping bag is removed from the wheelchair to thereby conserve space. A mounting sleeve for the shopping bag support slips over the armrest of the wheelchair and presents a secure yet unobtrusive securement means for releasably securing the shopping bag support to the wheelchair. A pair of adjustable support struts are slidably secured to the backstop to provide stabilization between the shopping bag support and the framework of the wheelchair.

It is, therefore, a primary object of this invention to provide improvements in shopping bag supports for wheelchairs.

Another object of this invention is to provide improvements in the method of supporting a shopping bag on a wheelchair.

Another object of this invention is to provide a shopping bag support for a wheelchair, the shopping bag support being foldable when not in use.

Another object of this invention is to provide a shopping bag support that is readily mountable to and demountable from the wheelchair particularly in the absence of tools.

Another object of this invention is to provide a shopping bag support for a wheelchair wherein a pair of support arms removably receive the shopping bag.

Another object of this invention is to provide a mounting sleeve for the shopping bag support, the mounting sleeve being visually pleasing and having minimal interference with the normal usage of the armrest.

These and other objects and features of the present invention will become more readily apparent from the following description in which preferred and other embodiments of the invention have been set forth in conjunction with the accompanying drawing and appended claims.

BRIEF DESCRIPTION OF THE DRAWING

FIG. 3 is an exploded, perspective view of the backstop, the mounting sleeve, the support frame, and the lateral braces for my novel shopping bag support apparatus;

FIG. 4 is a cross-sectional view of the mounting sleeve taken along lines 4—4 of FIG. 3.

DETAILED DESCRIPTION OF THE PREFERRED EMBODIMENT

Figure 1:
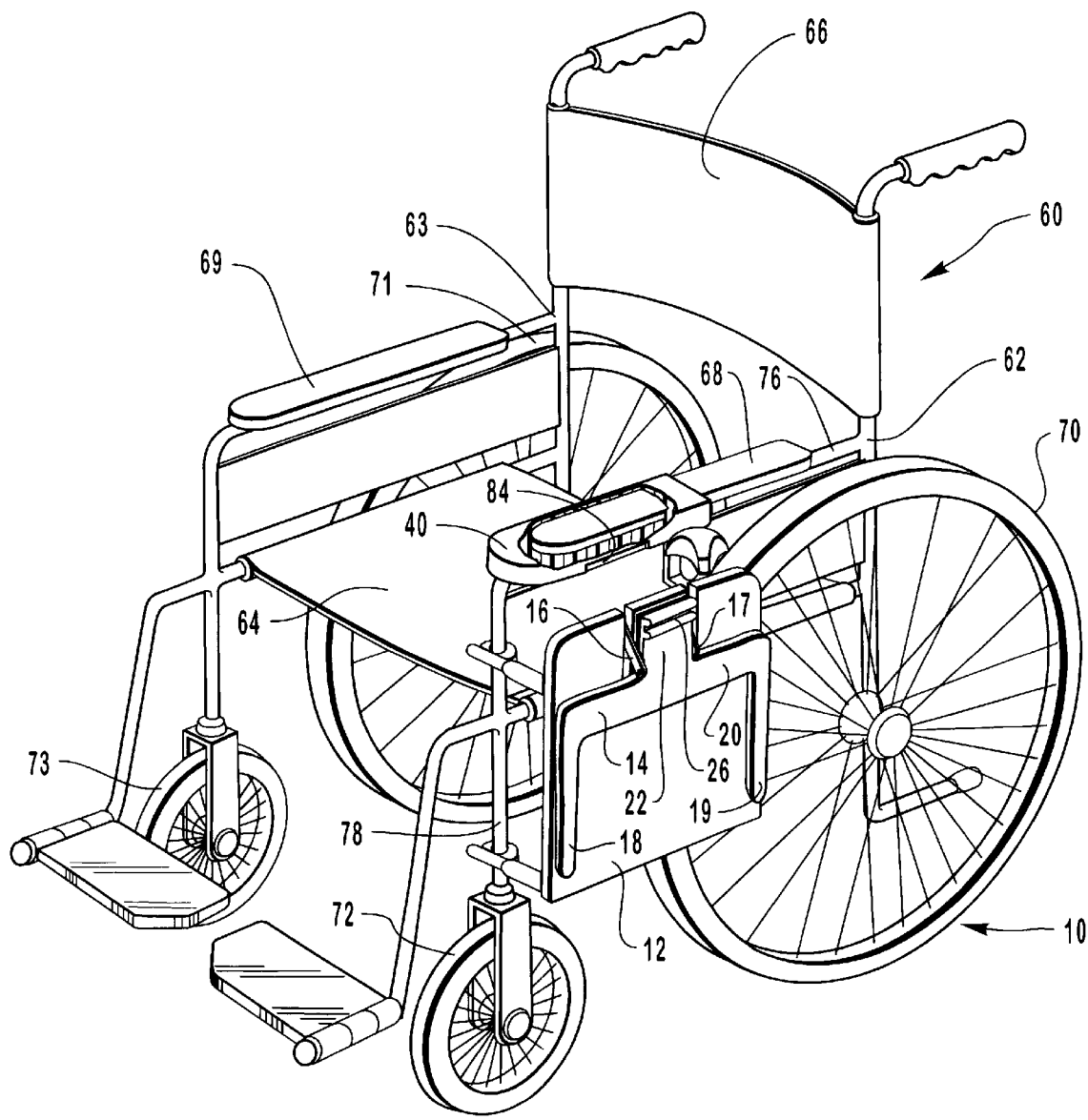
FIG. 1 is a perspective view of the novel, foldable shopping bag support of this invention shown in the environment of a wheelchair with the support frame for the shopping bag shown folded downwardly and with a portion of the mounting sleeve broken away to reveal the armrest telescopically received therein.

The invention is best understood from the following description with reference to the drawing wherein like parts are designated by like numerals throughout and taken in conjunction with the appended claims.

GENERAL DISCUSSION

I specifically designed my novel shopping bag support system for a wheelchair to be readily mountable to and demountable from the wheelchair by the occupant of the wheelchair, particularly in the absence of tools. The shopping bag support system includes a backstop designed to be supported parallel to the side of the wheelchair and reside outside the wheel to thereby keep the shopping bag from interfering with the operation of the wheel. The backstop is suspended from a sleeve-like socket or mounting sleeve that is telescopically mounted to the armrest of the wheelchair. Adjustable struts removably engage the framework of the wheelchair to support the backstop in its spaced relationship to the wheelchair. The shopping bag support is configured as two, spaced support arms on a support frame that is folded vertically to lie flat against the backstop when in the stowed position and raised to the horizontal orientation to support the shopping bag between the support arms.

The shopping bag is fabricated from a suitable material such as fabric, leather, plastic, or the like, and includes a pair of transverse tubes or sockets designed to receive therein the two, spaced support arms of the shopping bag support. The shopping bag also has a pair of handles and, preferably, a plurality of ring-like structures or stiffeners sewn into the base of the shopping bag to provide the shopping bag with a flat bottom. When not in use the shopping bag is folded into a flattened profile and the shopping bag support is folded downwardly into juxtaposition with the backstop.

To use the shopping bag, the wheelchair occupant merely raises the support frame to the horizontal position and then secures the shopping bag to the support arms by sliding the sockets over the support arms. The shopping bag is thus suspended between the support arms and rests against the backstop. In this position the shopping bag is readily accessible to the wheelchair occupant for receipt of items selected for purchase. Removal of the shopping bag and its contents is easily accomplished by the wheelchair occupant simply grasping the handles of the shopping bag and sliding the shopping bag outwardly and off the support arms.

DETAILED DESCRIPTION

Figure 2:
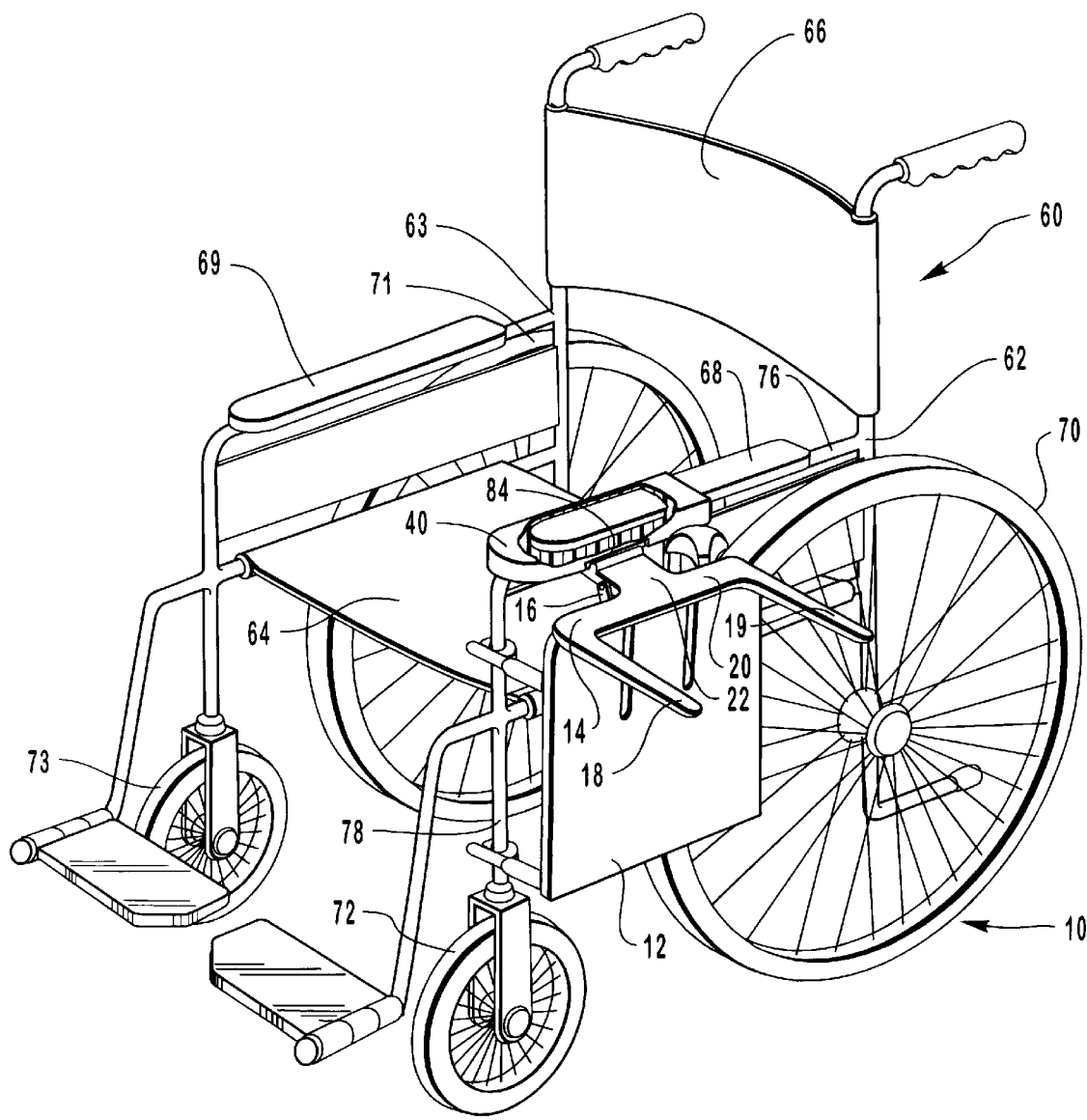
FIG. 2 is the perspective view of FIG. 1 showing the shopping bag support frame in the horizontal orientation.

Referring now to FIGS. 1 and 2, the novel, foldable shopping bag support of this invention is shown generally at 10 and in the environment of a wheelchair 60. Wheelchair 60 is shown herein for purposes of illustration only. Wheelchair 60 is a conventional wheelchair having a structure that essentially consists of two, mirror-image side frames 62 and 63 which are foldably interconnected across a seat 64 and a back rest 66 to form wheelchair 60. Side frame 62 rotatably supports a large wheel 70 and a smaller, castered wheel 72 in front of large wheel 70. A similar large wheel 71 and castered wheel 73 are rotatably supported by side frame 63.

Shopping bag support 10 includes a backstop 12 and a support frame 14 pivotally connected to back-stop 12 by a pair of linkages, first linkage 16 and second linkage 17. Support frame 14 is configured with a general U-shaped configuration having a first support arm 18 and a second support arm 19 extending outwardly from a basal element 20. A handle/interlock 22 extends from basal element 20 and serves both as a handle for raising and lowering support frame 14 as well as an interlock for releasably engaging support frame 14 to a mounting sleeve 40 as will be discussed more fully hereinafter. As shown in FIG. 1, support frame 14 is oriented vertically alongside backstop 12 when support frame 14 is placed in its stowed position. FIG. 2 shows support frame 14 oriented horizontally in its operational position for supporting shopping bag 90 (FIG. 5) as will be discussed more fully hereinafter.

Referring now to FIG. 3, the rear face of backstop 12 is shown having a mounting bracket 30 secured thereto. Mounting bracket 30 is configured with a flange 32 that extends orthogonally from backstop 12 and includes a threaded bore 34 therethrough. Mounting sleeve 40 is configured to demountably secure shopping bag support 10 to wheelchair 60 by being telescopically slipped over armrest 68. Mounting sleeve 40 includes a support bracket 42 mounted thereto and extending downwardly therefrom. A horizontal foot 44 is formed on support bracket 42 and serves as the mounting surface against which flange 32 is secured. Horizontal foot 44 includes an elongated slot 46 therethrough to thereby accommodate a limited degree of longitudinal adjustability between flange 32 and horizontal foot 44. A threaded bolt 36 passes through elongated slot 46 and into threaded engagement with threaded bore 34 to thereby adjustably secure flange 32 to the bottom surface of horizontal foot 44.

Backstop 12 also provides a support surface for a pair of strut footings 50 and 51. Each of strut footings 50 and 51 includes horizontal, undercut slots 52 and 53, respectively, therethrough which provide the engagement mechanism for anchoring the base of struts 54 and 55, respectively, thereto. Specifically, the base of strut 54 is formed with a narrow neck and shoulder section 56 which is slidingly received in undercut slot 52. A corresponding narrow neck and shoulder 57 is found on strut 55 and is slidingly received in undercut slot 53. A spar 58 extends coaxially from strut 54 and is longitudinally extensible. Similarly, a spar 59 extends coaxially from strut 55 and is longitudinally extensible. Spring clips 48 and 49 on the ends of spars 58 and 59, respectively, provide a releasable engagement mechanism for engaging a portion of a vertical leg 78 of side frame 62 (FIGS. 1 and 2).

Support frame 14 is configured with a generally U-shaped profile having support arms 18 and 19 forming the two legs of the U-shape. Handle/interlock 22 has a transverse slot 26 in the end thereof which is designed to releasably engage a lip 84 (FIG. 1) in the lower edge of mounting sleeve 40 when support frame 14 is pivotally oriented to the horizontal position. A pair of linkages 16 and 17 pivotally connect support frame 14 to backstop 12 and cooperate in slots 86 and 87, respectively, in the upper end of backstop 12. The ends of linkage 16 are pivotally mounted at pivots 28a and 28b while the ends of linkage 17 are pivotally mounted at pivots 29a and 29b.

Referring now to FIG. 4, mounting sleeve 40 is shown in this cross-sectional view as having an armrest socket 80 formed therein so that mounting sleeve 40 can be telescopically mounted over armrest 68. A corresponding frame socket 82 is configured to telescopically receive horizontal frame 76 therein. Mounting sleeve 40 is designed to be slidingly inserted over armrest 68 and horizontal frame 76 to thereby securely mount mounting sleeve to wheelchair 60. Importantly, mounting sleeve 40 is fabricated from a suitable plastic material and, preferably, a clear plastic material such as lucite, plexiglass, polycarbonate, or the like, and is provided with a smooth, visually and tactilely pleasing surface. The clear plastic composition of mounting sleeve 40 allows mounting sleeve 40 to be interchangeably mountable to various types of wheelchair 60 without detracting from the visual appearance of the same. The smooth profile of mounting sleeve 40 reduces any unpleasant tactile sensation to the occupant (not shown) of wheelchair 60. Mounting sleeve 40 also includes a downwardly oriented lip 84 in the sidewall of armrest socket 80. Lip 84 provides an engagement for a slot 26 in the end of handle/interlock 22 when support frame 14 is placed in its horizontal or support orientation for supporting shopping bag 90.

Figure 5:
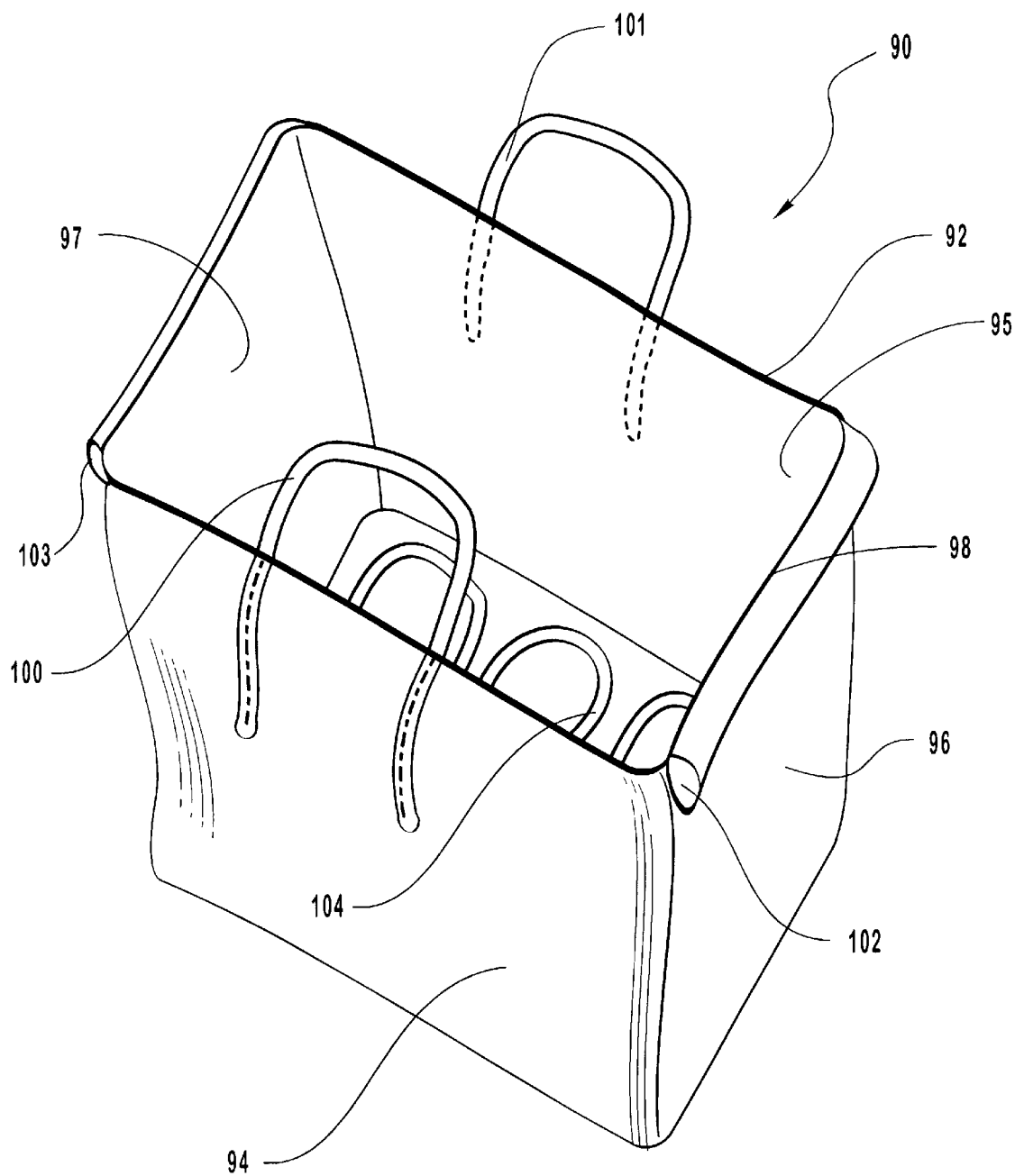
FIG. 5 is a perspective view of the shopping bag.

Referring now to FIG. 5, the preferred embodiment of my novel shopping bag is shown generally at 90 and includes a bag body 92 formed with side walls 94 and 95, end walls 96 and 97 and a bottom 98. A pair of handles, handle 100 and handle 101 are secured to side walls 94 and 95, respectively, and provide a convenient mechanism for carrying shopping bag 90. End wall 96 includes a socket 102 while end wall 97 includes a socket 103. Sockets 102 and 103 are located adjacent the upper end of shopping bag 90 and are configured to be telescopically mounted to support arms 28 and 29, respectively, when support frame 14 is in its horizontal or support orientation. A plurality of stiffeners 104 are secured to bottom 98 to provide a desired degree of stiffening to bottom 98.

The Method

The novel method of this invention is practiced by the occupant (not shown) of wheelchair 60 placing mounting sleeve 40 on armrest 68. This is done by telescopically sliding mounting sleeve 40 over armrest 68 and horizontal frame 76 until armrest 68 is snugly received inside armrest socket 80 and horizontal frame 76 is snugly received inside frame socket 82. With mounting sleeve 40 secured to wheelchair 60, backstop 12 is mounted to horizontal foot 44 by passing threaded bolt 36 downwardly through elongated slot 46 and into threaded engagement with threaded bore 34 in flange 32. Struts 54 and 55 are then mounted to strut footings 50 and 51, respectively, while spring clips 48 and 49 are clipped to vertical leg 78. The orientation of shopping bag support 10 is adjustably positioned relative to wheelchair 60 by selectively adjusting the position of threaded bolt 36 in elongated slot 46 as well as the position and length of struts 54 and 55. In this manner, the occupant is readily able to mount shopping bag support 10 to wheelchair 60.

Prior to placing objects into shopping bag 90, shopping bag 90 is mounted to support frame 14. This is accomplished by pivotally raising support frame 14 from its vertical/stowed orientation shown in FIG. 1 to its horizontal/support orientation shown in FIG. 2 with slot 26 engaged over lip 84. Sockets 102 and 103 are slipped over support arms 18 and 19, respectively, to bring bag body 92 into juxtaposition against backstop 12. Shopping bag 90 is now conveniently available to receive items therein. Importantly, backstop 12 prevents shopping bag 90 from interfering with the smooth operation of either large wheel 70 or small wheel 72.

Upon completion of the shopping trip, the occupant need merely remove shopping bag 90 from support frame 14 and then pivotally lower support frame 14 to its vertical/stowed orientation. Removal of shopping bag support 10 from wheelchair 60 is easily accomplished by removing spring clips 48 and 49 from vertical leg 78 and then slidingly removing armrest sleeve 40 from armrest 68 and horizontal frame 76. Alternatively, the occupant need only remove bolt 36 and detach spring clips 48 and 49 to achieve removal of backstop 12 and support frame 14 from wheelchair 60. Mounting sleeve 40 can either remain on side frame 62 or may be removed at the selection of the occupant.

Importantly, all of the foregoing steps or operations are readily accomplished by the occupant in the complete absence of tools such as wrenches, pliers, screwdrivers, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A shopping bag support demountably attachable to a wheelchair comprising:

a backstop;

a mounting sleeve configured to be releasably mounted to the armrest of a wheelchair;

a bracket on said armrest sleeve;

mounting means on said backstop for mounting said backstop to said bracket; and a shopping bag support frame mounted to said backstop.

2. The shopping bag support defined in claim 1 wherein said shopping bag support includes a shopping bag removably mountable to said shopping bag support frame.

3. The shopping bag support defined in claim 2 wherein said shopping bag includes a stiffener means in a bottom of said shopping bag for providing a floor to said shopping bag.

4. The shopping bag support defined in claim 2 wherein said shopping bag support frame comprises two spaced support arms extending from a basal element.

5. The shopping bag support defined in claim 2 wherein said shopping bag support frame includes pivotal support means for pivotally mounting said shopping bag support frame to said backstop.

6. The shopping bag support defined in claim 2 wherein said pivotal support means comprises a pair of linkages pivotally mounted between said shopping bag support frame and said backstop, said linkages supporting said support means at a vertical, stowed orientation in juxtaposition with said backstop and at a horizontal, support orientation.

7. The shopping bag support defined in claim 1 wherein said mounting sleeve comprises a body having an armrest socket formed therein to accommodate said mounting sleeve being telescopically mounted to the armrest of the wheelchair, said mounting sleeve also including a frame socket as an extension of said armrest socket for telescopically receiving a portion of the frame of the wheelchair.

8. The shopping bag support defined in claim 1 wherein said backstop includes a strut means for releasably securing said backstop to a framework of the wheelchair.

9. The shopping bag support defined in claim 8 wherein said strut means comprises at least one strut, said strut having longitudinal adjustment means for adjustably altering the length of said strut.

10. The shopping bag support defined in claim 9 wherein said strut includes a spring clip for releasably engaging the framework of the wheelchair.

11. A shopping bag support for a wheelchair comprising:

a backstop;

a shopping bag support frame pivotally mounted to said backstop;

a shopping bag;

attachment means for removably mounting said shopping bag on said shopping bag support frame; and mounting means for removably mounting said shopping bag support to the wheelchair.

12. The shopping bag support defined in claim 11 wherein said backstop includes strut means for supporting said backstop in spaced relationship to the wheelchair.

13. The shopping bag support defined in claim 11 wherein said shopping bag support frame includes a first support arm and a second support arm, said second support arm being spaced from said first support arm, said attachment means including a first socket and a second socket on said shopping bag, said first socket being configured to be telescopically mounted to said first support arm and said second socket being configured to be telescopically mounted to said second support arm.

14. The shopping bag support defined in claim 11 wherein said shopping bag includes a stiffener means in the bottom of said shopping bag.

15. The shopping bag support defined in claim 11 wherein said backstop includes a mounting means for removably mounting said shopping bag support to the wheelchair, said mounting means including a mounting sleeve having an armrest socket therein to thereby adapt said mounting sleeve to being telescopically mounted to an armrest of the wheelchair, said mounting sleeve including a mounting bracket for removably mounting said backstop to said mounting sleeve.

16. A method for removably supporting a shopping bag on a wheelchair comprising the steps of:

forming a mounting sleeve for telescopically receiving at least a portion of the armrest of the wheelchair;

mounting said mounting sleeve to the armrest by telescopically enclosing a portion of the armrest in said mounting sleeve;

attaching a backstop to said wheelchair;

pivotally supporting a shopping bag support frame on said backstop;

removably engaging said shopping bag support frame to said armrest sleeve;

suspending said shopping bag from said shopping bag support frame when said shopping baa support frame is engaged to said armrest sleeve; and shielding the wheelchair against said shopping bag with said backstop.

17. The method defined in claim 16 wherein said shielding step includes bracing said backstop against a framework of the wheelchair thereby maintaining the spatial relationship of said backstop of the wheelchair.

18. The method defined in claim 16 wherein said suspending step includes forming a pair of spaced sockets on said shopping bag and mounting said sockets over a pair of support arms on said shopping bag support.

19. The method defined in claim 16 wherein said securing step includes pivotally linking said shopping bag support thereby providing said shopping bag support with a stowage capability.

* * * * *